US011286132B2

(12) United States Patent
Monzon et al.

(10) Patent No.: US 11,286,132 B2
(45) Date of Patent: Mar. 29, 2022

(54) ENHANCING THE TRANSPORT CAPACITY OF AN ELEVATOR SYSTEM

(71) Applicant: Otis Elevator Company, Farmington, CT (US)

(72) Inventors: Andres Monzon, Madrid (ES); Fernando Del Rio, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 399 days.

(21) Appl. No.: 16/536,892

(22) Filed: Aug. 9, 2019

(65) Prior Publication Data

US 2020/0048032 A1 Feb. 13, 2020

(30) Foreign Application Priority Data

Aug. 10, 2018 (EP) .................................... 18188551

(51) Int. Cl.
*B66B 1/32* (2006.01)
*B66B 1/34* (2006.01)
(Continued)

(52) U.S. Cl.
CPC .............. *B66B 1/32* (2013.01); *B66B 1/3476* (2013.01); *B66B 1/3492* (2013.01); *B66B 5/06* (2013.01); *B66B 5/16* (2013.01); *B66B 2201/231* (2013.01)

(58) Field of Classification Search
CPC ....... B66B 1/3492; B66B 5/0031; B66B 1/32; B66B 1/34; B66B 5/0018; B66B 5/04;
(Continued)

(56) References Cited

U.S. PATENT DOCUMENTS

| | | |
|---|---|---|
| 4,452,341 A | 6/1984 | Tanahashi |
| 7,011,184 B2 | 3/2006 | Smith et al. |

(Continued)

FOREIGN PATENT DOCUMENTS

| | | |
|---|---|---|
| CN | 102295206 A | 12/2011 |
| DE | 20314938 U1 | 2/2005 |

(Continued)

OTHER PUBLICATIONS

European Examination Report for Application No. 18188551.8; dated Apr. 15, 2021; 5 Pages.

(Continued)

*Primary Examiner* — Marlon T Fletcher
(74) *Attorney, Agent, or Firm* — Cantor Colburn LLP

(57) ABSTRACT

An elevator system (2) comprises a hoistway (4) extending between a plurality of landings (8*a*, 8*b*, 8*c*); an elevator car (60) configured for moving along the hoistway (4) between the plurality of landings (8*a*, 8*b*, 8*c*); a load/weight sensor (44) configured for detecting the load of the elevator car (60); a speed detector (34) configured for detecting the speed of the elevator car (60); and an elevator safety system. The elevator safety system comprises a safety gear (20) configured for stopping, upon activation, any movement of the elevator car (60); and an electronic safety controller (30) configured for activating the safety gear (20) when the detected speed of the elevator car (60) exceeds a set speed limit. The electronic safety controller (30) is configured for setting the speed limit as a function of the load detected by the load/weight sensor (44).

15 Claims, 1 Drawing Sheet

(51) Int. Cl.
*B66B 5/06* (2006.01)
*B66B 5/16* (2006.01)

(58) Field of Classification Search
CPC ......... B66B 5/044; B66B 1/3476; B66B 1/44; B66B 13/24
See application file for complete search history.

(56) References Cited

U.S. PATENT DOCUMENTS

| | | | | |
|---|---|---|---|---|
| 7,537,090 | B2 | 5/2009 | Vaentaenen | |
| 8,997,968 | B2 | 4/2015 | Braasch et al. | |
| 9,359,173 | B2 | 6/2016 | Dube | |
| 9,708,157 | B2 | 7/2017 | Porta et al. | |
| 9,771,243 | B2 | 9/2017 | Kattainen et al. | |
| 9,776,827 | B2 | 10/2017 | Harkonen et al. | |
| 9,975,732 | B2 | 5/2018 | Annen et al. | |
| 2004/0200671 | A1 | 10/2004 | Kugiya et al. | |
| 2006/0289241 | A1* | 12/2006 | Okamoto | B66B 1/3492 187/292 |
| 2007/0089938 | A1* | 4/2007 | Ishioka | B66B 7/08 187/391 |
| 2010/0155183 | A1* | 6/2010 | Takahashi | B66B 1/32 187/288 |
| 2013/0327598 | A1* | 12/2013 | Rebillard | B66B 1/44 187/280 |
| 2014/0231180 | A1* | 8/2014 | Kallioniemi | B66B 11/009 187/256 |
| 2014/0299422 | A1* | 10/2014 | Kangas | B66B 3/02 187/394 |
| 2014/0312884 | A1* | 10/2014 | Reilio | G01P 3/42 324/207.11 |
| 2016/0068368 | A1* | 3/2016 | Hovi | B66B 1/06 187/247 |
| 2016/0145074 | A1 | 5/2016 | Kattainen et al. | |
| 2017/0043978 | A1* | 2/2017 | Valjus | B66B 5/044 |
| 2018/0093866 | A1* | 4/2018 | Weibel | B66B 11/08 |
| 2018/0111789 | A1 | 4/2018 | Puranen et al. | |
| 2018/0237261 | A1* | 8/2018 | Herkel | B66B 1/3492 |
| 2019/0168995 | A1* | 6/2019 | Tutat | B66B 5/0031 |
| 2019/0389694 | A1* | 12/2019 | Herkel | B66B 5/0031 |
| 2020/0048032 | A1* | 2/2020 | Monzon | B66B 1/3476 |
| 2020/0052929 | A1* | 2/2020 | Pahlke | B66B 25/003 |
| 2020/0102186 | A1* | 4/2020 | Pahlke | B66B 1/468 |
| 2020/0102187 | A1* | 4/2020 | Pahlke | B66B 5/0012 |
| 2020/0130985 | A1* | 4/2020 | Ruhnke | B66B 5/18 |
| 2020/0189877 | A1* | 6/2020 | Manes | B66B 1/3453 |
| 2021/0245993 | A1* | 8/2021 | Palazzola | B66B 1/3492 |

FOREIGN PATENT DOCUMENTS

| | | | |
|---|---|---|---|
| EP | 1688383 | A1 | 8/2006 |
| EP | 1864936 | B1 | 10/2014 |
| JP | 2002145542 | A | 5/2002 |
| WO | 2015078859 | A1 | 6/2015 |

OTHER PUBLICATIONS

European Search Report for application 18188551.8, dated Feb. 11, 2019, 7 pages.

* cited by examiner

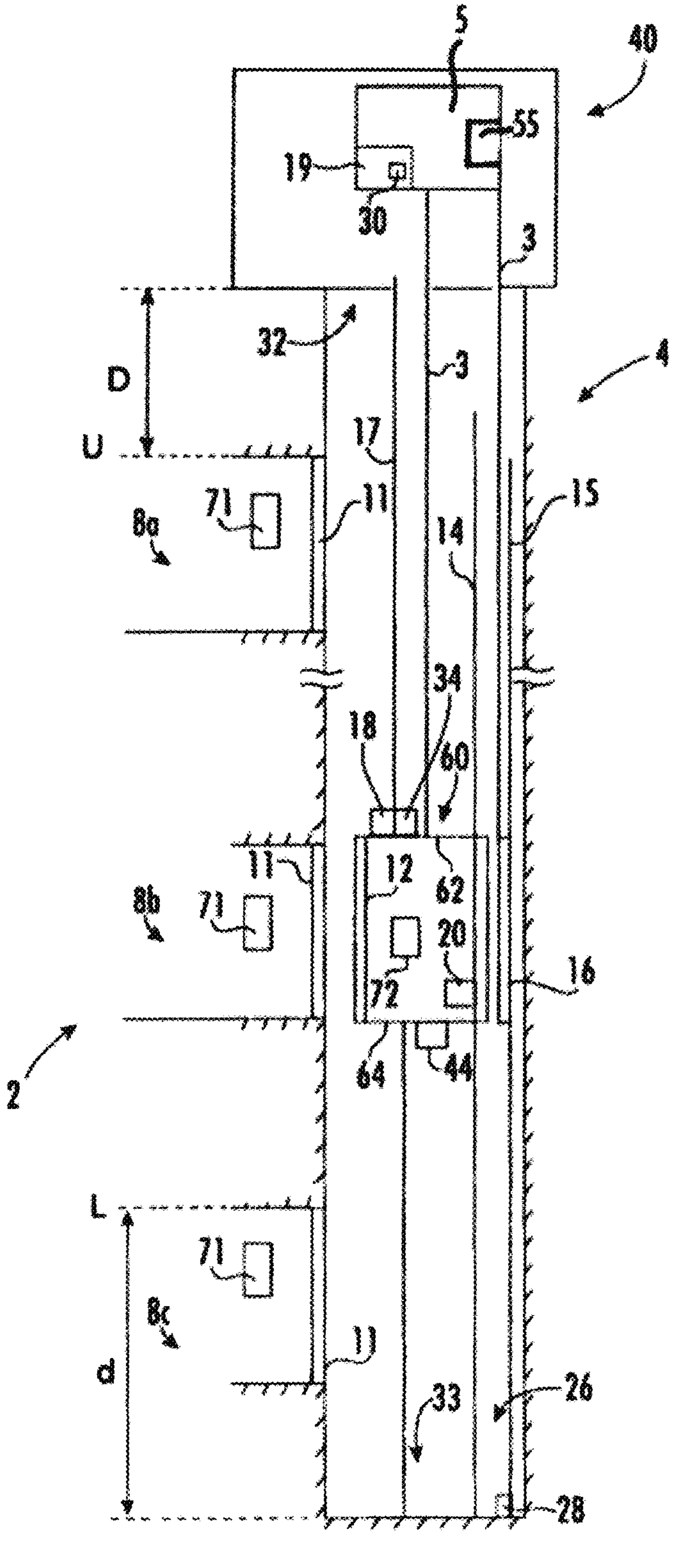
5
40
55
19
30
3
32
3
4
D
U
17
71
11
8a
14
15
34
18
60
11
12
62
8b
71
20
72
16
64
44
2
L
71
8c
11
d
33
26
28

ENHANCING THE TRANSPORT CAPACITY OF AN ELEVATOR SYSTEM

FOREIGN PRIORITY

This application claims priority to European Patent Application No. 18188551.8, filed Aug. 10, 2018, and all the benefits accruing therefrom under 35 U.S.C. § 119, the contents of which in its entirety are herein incorporated by reference.

BACKGROUND

The invention relates to enhancing the transport capacity of an elevator system including an elevator safety system.

An elevator system typically comprises at least one elevator car moving along a hoistway extending between a plurality of landings, and a driving member configured for driving the elevator car.

An elevator system usually further comprises an elevator safety system configured for monitoring and checking the operation of the elevator system in order to stop any further operation of the elevator system, in particular any movement of the elevator car, in case an unsafe condition of the elevator system occurs. Such unsafe conditions in particular may include situations in which the speed and/or acceleration of the elevator car exceeds a predefined limit.

It would be beneficial to increase the transport capacity of such an elevator system without compromising its safety.

SUMMARY

According to an exemplary embodiment of the invention, an elevator system comprises: a hoistway extending between a plurality of landings; an elevator car configured for moving along the hoistway between the plurality of landings; a load/weight sensor configured for detecting the load and/or weight of the elevator car; a speed detector configured for detecting the speed of the elevator car; and an elevator safety system. The elevator safety system comprises a safety gear configured for stopping, upon activation, any movement of the elevator car; and an electronic safety controller configured for activating the safety gear when the detected speed of the elevator car exceeds a set speed limit. The electronic safety controller is configured for setting the speed limit as a function of the load and/or weight detected by the load/weight sensor.

According to an exemplary embodiment of the invention, a method of operating an elevator system includes moving an elevator car along a hoistway between the plurality of landings; detecting the load and/or weight of the elevator car; setting a rated speed of the elevator car as a function of the detected load and/or weight of the elevator car; setting a speed limit as a function of the detected load and/or weight of the elevator car; detecting the current speed of the elevator car; and activating a safety gear for stopping any further movement of the elevator car when the detected speed of the elevator car exceeds the set speed limit.

In the present context, unless explicitly state otherwise, "weight" refers to the total weight ("total mass" or "total suspended weight") of the elevator car, i.e. the weight of the empty elevator car plus the weight of all passengers and/or cargo within the elevator car. "Load" refers to the in-car load provided by passengers and/or cargo within the elevator car. I.e., in contrast to "weight", "load" does not include the empty car weight, i.e. the weight of the empty elevator car.

Setting/adjusting the speed limit as a function of the detected load and/or weight of the elevator car allows increasing the rated speed of the elevator car as a function of its load and/or weight.

For example, when the elevator car is supposed to move upwards, the rated speed of the elevator car may be increased when the load is lower than the maximum load. The maximum rated speed is reached when the weights of the elevator car and a counterweight moving concurrently and in opposite direction with respect to the elevator car are identical. When the load of the elevator car further decreases, the elevator car becomes lighter than the counterweight. Thus, the drive needs to hold and/or brake the elevator car instead of propelling it. In consequence, in order to allow for a safe operation of the elevator system, the rated speed is reduced.

When the elevator car is supposed to move downwards, the situation is reversed. I.e. a light elevator car, which is lighter than the counterweight, needs to be propelled, and a heavy elevator car, which is heavier than the counterweight, needs to be held and/or braked. However, again the maximum rated speed is reached when the weights of the elevator car and the counterweight are identical.

Exemplary embodiments of the invention allow adjusting the rated speed of the elevator car individually for each run based on the current load and/or weight of the elevator car during the respective run.

As a result of increasing the rated speed of the elevator car, a current run may be completed faster and a new run for transporting new passengers and/or cargo may be started earlier. In consequence, more passengers and/or cargo may be transported in a given period of time, and the transport capacity of the elevator system is increased. As the movement of the elevator car is still monitored and controlled by the safety controller even when the elevator car is moved with an increased speed, the safety of the elevator system is not compromised.

A number of optional features are set out in the following. These features may be realized in particular embodiments, alone or in combination with any of the other features, unless explicitly stated otherwise.

The safety controller may be configured for setting the speed limit as a function of the moving direction of the elevator car within the hoistway. Thus, the speed limit may be set differently for an upward movement and a downward movement of the elevator car, respectively. This is beneficial, as it allows moving a heavy elevator car faster downwards than upwards. Correspondingly, an elevator car transporting less load and/or cargo, in particular an elevator car which is lighter than a corresponding counterweight moving concurrently and in opposite direction with respect to the elevator car, may move upwards faster than downwards. Setting the speed limit as a function of the moving direction of the elevator car allows adjusting the safety controller to said different operating modes.

The elevator system may comprise a car position sensor configured for detecting the position of the elevator car within the hoistway; and the electronic safety controller may be configured for setting the speed limit, which is the speed limit of the safety system for actuating the safety gear, as a function of the detected position of the elevator car within the hoistway. The electronic safety controller in particular may be configured for reducing the speed limit when the elevator car approaches an end of the hoistway. This prevents the elevator car from hitting against the upper or lower end of the hoistway or overshooting a scheduled target landing.

The load/weight sensor may be configured for detecting the weight of the elevator car and/or the load of passengers and/or cargo within the elevator car. The electronic safety controller in particular may be configured for setting the speed limit as a function of a difference between the detected current weight of the elevator car (including the weight of passengers and/or cargo within the elevator car) and the weight of a counterweight moving concurrently and in opposite direction with respect to the elevator car.

The load/weight sensor may be provided at the bottom, e.g. below the floor, of the elevator car and/or at the tension member. Other positions of the load/weight sensor are possible as well. For example, a load/weight sensor may be arranged between an elevator drive and a support structure to which the elevator drive is elastically mounted. Further, the load/weight of the elevator car may be determined from the output of a torque sensor provided at the elevator drive. In such a configuration, the torque sensor acts as an indirect load/weight sensor.

The safety gear may include at least one bidirectionally acting safety gear configured for stopping the movement of the elevator car in two opposite directions, and/or at least one unidirectionally acting safety gear. The safety gear in particular may include two unidirectionally acting safety gears, wherein each safety gear is configured for stopping the movement of the elevator car in one direction, respectively.

The elevator system may comprise a motion control system configured for controlling the movement of the elevator car according to a movement profile and for setting a rated speed of the elevator car as a function of the load and/or weight detected by the load/weight sensor. The motion control system may be provided within the elevator drive, as an elevator controller provided separately from the elevator drive or it may be distributed between the elevator drive and a separate elevator controller. Switching between different movement profiles/rated speeds of the elevator car based on the current load and/or weight of the elevator car allows increasing the transport capacity of the elevator system by reducing the time periods needed for the individual runs.

In the present context, "rated speed" refers to the rated speed to which the elevator car is accelerated by the motion control system. In contrast, "speed limit" refers to the speed limit set by the safety controller. The safety controller activates the at least one safety gear, when the actual speed of the elevator car exceeds the set speed limit. In order to prevent the at least one safety gear from being activated during normal operation, the speed limit must not be set lower than the rated speed.

The electronic safety controller may be configured for setting the speed limit according to a movement profile and/or according to the rated speed set by the motion control system. Adjusting the speed limit of the safety controller in correspondence with a rated speed set by the motion control system prevents the safety controller from undesirably activating the at least one safety gear when the elevator car is moved with an increased speed set by the motion control system.

The electronic safety controller in particular may be configured for setting the speed limit according to a movement profile and/or according to the rated speed set by the motion control system.

DRAWING DESCRIPTION

In the following, exemplary embodiments of the invention are described in more detail with respect to the enclosed figure which depicts an elevator system in an example embodiment.

DETAILED DESCRIPTION

The FIGURE schematically depicts an elevator system 2 according to an exemplary embodiment of the invention.

The elevator system 2 includes an elevator car 60 movably arranged within a hoistway 4 extending between a plurality of landings 8*a*, 8*b*, 8*c*. The elevator car 60 in particular is movable along at least one car guide member 14, such as a guide rail, extending along the vertical direction of the hoistway 4. Although only one elevator car 60 is depicted in the FIGURE, the skilled person will understand that exemplary embodiments of the invention may include elevator systems 2 having a plurality of elevator cars 60 moving in one or more hoistways 4.

The elevator car 60 is movably suspended by means of a tension member 3. The tension member 3, for example a rope or belt, is connected to an elevator drive 5 comprising a motor 55 configured for driving the tension member 3 in order to move the elevator car 60 along the height of the hoistway 4 between the plurality of landings 8*a*, 8*b*, 8*c*, which are located on different floors.

Each landing 8*a*, 8*b*, 8*c* is provided with an elevator landing door 11, and the elevator car 60 is provided with a corresponding elevator car door 12 for allowing passengers to transfer between a landing 8*a*, 8*b*, 8*c* and the interior of the elevator car 60 when the elevator car 60 is positioned at the respective landing 8*a*, 8*b*, 8*c*.

The exemplary embodiment shown in the FIGURE uses a 1:1 roping for suspending the elevator car 60. The skilled person, however, easily understands that the type of the roping is not essential for the invention and that different kinds of roping, e.g. a 2:1 roping or a 4:1 roping may be used as well.

The elevator system 2 includes further a counterweight 16 attached to the tension member 3 opposite to the elevator car 60 and moving concurrently and in opposite direction with respect to the elevator car 60 along at least one counterweight guide member 15, such as a counterweight guide rail. At least one buffer 28 may be provided within a pit 26 formed at a lower end 33 of the hoistway 4.

The skilled person will understand that the invention may be applied to elevator systems 2 which do not comprise a counterweight 16 as well.

The tension member 3 may be a rope, e.g. a steel wire rope, or a belt, e.g. a coated steel belt. The tension member 3 may be uncoated. Alternatively, the tension member may have a coating, e.g. in the form of a polymer jacket. In a particular embodiment, the tension member 3 may be a belt comprising a plurality of polymer coated steel cords (not shown). The elevator system 2 may have a traction drive including a traction sheave for driving the tension member 3.

Instead of a traction drive, a hydraulic drive or a linear drive may be employed for driving the tension member 3. In an alternative configuration, which is not shown in the FIGURES, the elevator system 2 may be an elevator system 2 without a tension member 3, comprising e.g. a hydraulic drive or a linear drive configured for driving the elevator car 60 without using a tension member 3.

The elevator drive 5 may be installed in a machine room 40 provided next to an upper end 32 of the hoistway 4. Alternatively, the elevator system 2 may be a machine room-less elevator system 2, e.g. an elevator system 2 in which the elevator drive 5 is located within the hoistway 4. The elevator drive 5 also may be accommodated in a cabinet (not shown) provided in the surroundings of the hoistway 4. The cabinet, for example, may be attached to, or enclosed in, an elevator landing door 11.

The elevator drive 5 is controlled by a motion control system 19 for moving the elevator car 60 along the hoistway 4 between the different landings 8*a*, 8*b*, 8*c*.

Input to the motion control system 19 may be provided via landing control panels 71 provided at each of the landings 8*a*, 8*b*, 8*c*, in particular close to the elevator landing doors 11, and/or via an elevator car control panel 72 provided inside the elevator car 60.

The elevator system 2 comprises at least one car position sensor 18 configured for determining the position of the elevator car 60 within the hoistway 4. The car position sensor 18 may be part of an absolute position reference system 17, 18 including the car position sensor 18 and a coded tape 17 extending along the length (height) of the hoistway 4. In such a configuration, the car position sensor 18 is configured for interacting with the code tape 27 for determining the current position of the elevator car 60 within the hoistway 4. The coded tape 17 may be coded mechanically, optically, and/or magnetically. Other absolute or relative position reference systems may be employed as well.

The elevator system 2 further may be provided with a speed sensor 34 configured for detecting the moving speed of the elevator car 60 when moving along the hoistway 4. The speed sensor 34 may be attached to the elevator car 60. The speed sensor 34 may be formed integrally with, or separately from, the car position sensor 18. The speed sensor 34 in particular may be configured to use the position information provided by the car position sensor 18 for determining the moving speed of the elevator car 60.

Additionally or alternatively, a speed sensor (not shown) may be provided at the elevator drive 5 for determining the moving speed of the elevator car 60 by detecting the moving speed of the tension member 3 at the elevator drive 5, e.g. by detecting the rotational speed of the motor 55 or an axle or sheave driving the tension member 3.

In addition or as an alternative to the speed sensor 34, the elevator system 2 may comprise an acceleration sensor (not shown) configured for measuring the acceleration of the elevator car 60. In this case, the speed of the elevator car 60 may be determined by integrating the speed measured by the acceleration sensor over time.

Alternatively, the acceleration of the elevator car 60 may be determined from the positional and/or speed information provided by the position sensor 18 and/or by the speed sensor 34, respectively. The acceleration of the elevator car 60 in particular may be calculated be differentiating the speed of the elevator car 60 with respect to time and/or by differentiating the position of the elevator car 60 twice with respect to time.

The landing control panels 71, the elevator car control panel 72, the car position sensor 18 and the speed sensor 34 may be connected with the motion control system 19 by electrical wires (not shown in the FIGURE), in particular by an electric bus, such as a CAN bus. Alternatively or additionally, wireless data connections may be used for transmitting information from the control panels 71, 72 and/or the sensors 18, 34 to the motion control system 19.

At least one of the elevator car 60 and the counterweight 16 is equipped with at least one safety gear 20.

Each safety gear 20 is operable to brake or at least assist in braking (i.e. slowing or stopping the movement) of the elevator car 60 relative to a car guide member 14 by engaging with the car guide member 14.

The at least one safety gear may be a bidirectionally acting safety gear 20 configured for braking the movement of the elevator car 60 in two opposite directions (upwards and downwards). Alternatively, the at least one safety gear 20 may comprise a combination of at least two unidirectionally acting safety gears 20, with each safety gear 20 being configured for braking the movement of the elevator car 60 in one direction, respectively.

The at least one safety gear 20 further may be configured so that a deceleration of 1 g is not exceeded even when the at least one safety gear 20 is activated while the elevator car 60 is moving with its rated speed.

In the exemplary embodiment depicted in the FIGURE, a single safety gear 20 is attached to the elevator car 60. More than one safety gears 20 may be attached to the elevator car 60 in order to increase the safety of the elevator system 2 by redundancy.

In a configuration in which the elevator system 2 comprises a plurality of car guide members 14, a safety gear 20 may be associated with each car guide member 14. Alternatively or additionally, two or more safety gears 20 configured to engage with the same car guide member 14 may be provided at the elevator cat 60 on top of each other.

In case the elevator system comprises a counterweight 16, at least one safety gear 20 may be attached to the counterweight 16. A safety gear 20 attached to the counterweight 16 is not depicted in the FIGURE.

The elevator system 2 further comprises a load/weight sensor 44 configured for detecting the current load and/or weight of the elevator car 60. The load/weight sensor 44 in particular may be a weight sensor configured for detecting the weight of elevator car 60 and/or the weight of passengers and/or cargo within the elevator car 60.

In order to detect the weight of passengers and/or cargo within the elevator car 60, the load/weight sensor 44 may be located at the floor 64 of the elevator car 70, as depicted in the FIGURE.

Additionally or alternatively, a load/weight sensor 44 may be provided at the tension member 3, in particular between the tension member 3 and the elevator car 60, and/or at the support of the tension member 3 at the elevator drive 5 in order to detect the total weight of the elevator car 60 together with its current load.

The current load of the elevator car 60 also may be determined by other means than a weight sensor; e.g. by at least one camera (not shown) arranged within the elevator car 60 and configured for providing pictures of the interior of the elevator car 60 in combination with a counter which is configured for determining the number of passengers within the elevator car 60 from pictures supplied by the at least one camera.

The elevator system 2 further comprises a safety controller 30, in particular an electronic safety controller 30. The safety controller 30 may be provided integrally with the motion control system 19 or it may be provided separately from the motion control system 19. The safety controller 30 is configured for activating the at least one safety gear 20 when a predefined safety condition is met. Safety conditions may include the position of the elevator car 60 as determined by the car position sensor 18 exceeding a predetermined upper positional limit U and/or falling below a predetermined lower positional limit L. Safety conditions may further include the speed and/or the acceleration of the elevator car 60 exceeding a predefined limit.

The load/weight sensor 44 is configured for transmitting a load detection signal indicating the current load of the elevator car 60 to the motion control system 19 and/or to the safety controller 30.

The load detection signal may be transmitted from the load/weight sensor 44 to the motion control system 19 and/or to the safety controller 30 via electrical wires (not shown in the FIGURE), in particular by an electric bus, such as a CAN bus. Alternatively or additionally, wireless data connections may be used for transmitting the load detection signal from the load/weight sensor to the motion control system 19 and/or to the safety controller 30.

The safety controller 30 is switchable between a plurality of different operating modes. The safety controller 30 in particular may be configured to switch between different operating modes based on the load detection signal provided by the load/weight sensor 44.

Switching between different operating modes may include changing the speed limit, i.e. the maximum speed of the elevator car 60 allowed by the safety controller 30, as a function of the current load of the elevator car 60 detected by the load/weight sensor 44. When switching between different operating modes, the safety controller 30 may also consider the current movement direction of the elevator car 60; i.e. for a given load, the safety controller 30 may switch to different operation modes depending on whether the elevator car 60 is moving upwards or downwards.

Such a configuration allows the motion control system 19 to move the elevator car 60 with different rated speeds depending on the current load of the elevator car 60 and the movement direction of the elevator car 60.

For example, in case the load/weight of the elevator car 60 is low, as only few passengers and/or little cargo are transported, the rated speed of the elevator car 60 moving upwards may be increased without overloading the motor 55 of the elevator drive 5.

Similarly, the rated speed of the elevator car 60 moving downwards may be increased in case the elevator car 60 is heavily loaded so that the movement of the elevator car 60 is supported by the force of gravity resulting from the (increased) weight of the elevator car 60.

When the rated speed of the elevator car 60 is increased, the elevator system 2 will need less time for completing the respective run. As a result, the next run for transporting new passengers and/or new cargo may start earlier. In consequence, the transport capacity of the elevator system 2 is increased.

In order to avoid that the movement of the elevator car 60 with increased speed is undesirably stopped by activating the at least one safety gear 20, the speed limit of the safety controller 30 is adjusted accordingly.

In order to ensure the safety of the elevator system 2 at the upper and lower ends 32, 33 of the hoistway 4, the rated speed of the elevator car 60 as well as the speed limit set by the safety controller 30 may be reduced when the elevator car 60 approaches the ends 32, 33 of the hoistway, for example when the elevator car 60, in particular the position sensor 18 of elevator car 60, comes closer than a predefined distance D, d to the respective end 32, 33 of the hoistway 4.

Said predefined distances D, d may be a function of the rated speed of the elevator car 60. I.e. predefined distances D, d may be increased when the rated speed of the elevator car 60 is increased in order to provide sufficient space for braking the elevator car 60 for preventing the elevator car 60 from hitting an end 32, 33 of the hoistway 4.

Similarly, the rated speed of the elevator car 60 set by the motion control system 19 may be reduced when the elevator car 60 approaches a scheduled target landing **8*a*, 8*b*, 8*c*, i.e. a landing 8*a*, 8*b*, 8*c* at which the elevator car 60 is supposed to stop, in order to allow a smooth approach to the scheduled target landings 8*a*, 8*b*, 8*c*. Reducing the rated speed of the elevator car 60 further helps to avoid that the elevator car 60 overshoots the scheduled target landings 8*a*, 8*b*, 8*c***.

An elevator system 2 with an elevator safety system according to exemplary embodiments of the invention allows increasing the transport capacity of the elevator system 2. An elevator system 2 according to an embodiment of the invention may be employed in existing buildings replacing a previously installed elevator system 2 without modifying the hoistway 4, in particular the overhead/pit spaces at the ends 32, 33 of the hoistway 4.

Elevator systems 2 according to exemplary embodiments of the invention provide a flexible solution for existing buildings with transport capacity issues. Since the hoistway 4 does not need to be modified, there is no need to perform civil works, cancel landings **8*a*, 8*b*, 8*c* or limit the elevator travel. When applied to a newly installed elevator system 2, the overhead at the upper end 32 of the hoistway 4 and/or the depth of the pit 26 at the lower end 33 of the hoistway 4 may be reduced, in order to reduce the overall space occupied by the elevator system 2**.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention shall not be limited to the particular embodiment disclosed, but that the invention includes all embodiments falling within the scope of the dependent claims.

REFERENCES

- 2 elevator system
- 3 tension member
- 4 hoistway
- 5 elevator drive
- **8*a*, 8*b*, 8*c*** landing
- 11 elevator landing door
- 12 elevator car door
- 14 car guide member
- 15 counterweight guide member
- 16 counterweight
- 17 coded tape
- 18 car position sensor
- 19 motion control system
- 20 safety gear
- 26 pit
- 28 buffer
- 30 safety controller
- 32 upper end of the hoistway
- 33 lower end of the hoistway
- 34 speed sensor
- 40 machine room
- 44 load/weight detector
- 55 motor
- 60 elevator car

62 roof of the elevator car
64 floor of the elevator car
D minimum distance of the upper positional limit from the upper end of the hoistway
d minimum distance of the lower positional limit from the lower end of the hoistway
L lower positional limit
U upper positional limit

What is claimed is:

1. An elevator system (2) comprising:
a hoistway (4) extending between a plurality of landings (8*a*, 8*b*, 8*c*);
an elevator car (60) configured for moving along the hoistway (4) between the plurality of landings (8*a*, 8*b*, 8*c*);
a load/weight sensor (44) configured for detecting the load and/or weight of the elevator car (60);
a speed detector (34) configured for detecting the speed of the elevator car (60); and
an elevator safety system comprising:
a safety gear (20) configured for stopping, upon activation, any movement of the elevator car (60); and
an electronic safety controller (30) configured for activating the safety gear (20) when the detected speed of the elevator car (60) exceeds a set speed limit;
wherein the electronic safety controller (30) is configured for setting the speed limit as a function of the load and/or weight detected by the load/weight sensor (44).

2. The elevator system (2) according to claim 1,
wherein the safety controller (30) is configured for setting the speed limit as a function of the moving direction of the elevator car (60) within the hoistway (4).

3. The elevator system (2) according to claim 1, further comprising a car position sensor (18) configured for detecting the position of the elevator car (60) within the hoistway (4); and
wherein the electronic safety controller (30) is configured for setting the speed limit as a function of the detected position of the elevator car (60) within the hoistway (4).

4. The elevator system (2) according to claim 3, wherein the electronic safety controller (30) is configured for reducing the speed limit when it is detected that the elevator car (60) approaches an end (32, 33) of the hoistway (4).

5. The elevator system (2) according to claim 3, wherein the electronic safety controller (30) is configured for reducing the speed limit when it is detected that the elevator car (60) approaches one of the landings (8*a*, 8*b*, 8*c*), in particular a scheduled target landing where the elevator car (60) is supposed to stop.

6. The elevator system (2) according to claim 1, wherein the load/weight sensor (44) is configured for detecting the weight of the elevator car (60) and/or the load of passengers and/or cargo within the elevator car (60), wherein the electronic safety controller (30) in particular is configured for setting the speed limit as a function of a difference between the detected weight of the elevator car (60) and the weight of a counterweight (16) moving concurrently and in opposite direction with respect to the elevator car (60).

7. The elevator system (2) according to claim 1, wherein the safety gear (20) includes at least one bidirectionally acting safety gear (20) configured for braking the movement of the elevator car (60) in two opposite directions.

8. The elevator system (2) according to claim 1, wherein the safety gear (20) includes a combination of at least two unidirectionally acting safety gears (20), wherein each safety gear (20) is configured for braking the movement of the elevator car (60) in one direction, respectively.

9. The elevator system (2) according to claim 1, further comprising a motion control system (19) configured for controlling the movement of the elevator car (60) according to a movement profile and for setting a rated speed of the elevator car (60) as a function of the load and/or weight detected by the load/weight sensor (44).

10. The elevator system (2) according to claim 9, wherein the electronic safety controller (30) is configured for setting the speed limit according to a movement profile and/or according to the rated speed set by the motion control system (19).

11. A method of operating an elevator system (2) wherein the method includes:
moving an elevator car (60) along a hoistway (4) between a plurality of landings (8*a*, 8*b*, 8*c*);
detecting a load and/or weight of the elevator car (60);
setting a rated speed of the elevator car (60) as a function of the detected load and/or weight of the elevator car (60);
setting a speed limit as a function of the detected load and/or weight of the elevator car (60);
detecting the current speed of the elevator car (60);
activating a safety gear (20) for stopping any further movement of the elevator car (60) when the detected speed of the elevator car (60) exceeds the set speed limit.

12. The method according to claim 11, wherein the method includes setting the speed limit as a function of the moving direction of the elevator car (60).

13. The method according to claim 11, wherein the method includes detecting the position of the elevator car (60) within the hoistway (4) and setting the speed limit as a function of the detected position of the elevator car (60).

14. The method according to claim 11, wherein the method includes reducing the speed limit when the elevator car (60) approaches an end (32, 33) of the hoistway (4) and/or reducing the speed limit when the elevator car (60) approaches one of the landings (8*a*, 8*b*, 8*c*), in particular a scheduled target landing.

15. The method according to claim 11, wherein the method includes detecting the weight of the elevator car (60) and/or the load of passengers and/or cargo within the elevator car (60), wherein the method in particular includes setting the speed limit as a function of a difference between the weight of the elevator car (60) and a counterweight (16) moving concurrently and in opposite direction with respect to the elevator car (60).

* * * * *